US008839251B2

(12) United States Patent
Dolph et al.

(10) Patent No.: US 8,839,251 B2
(45) Date of Patent: Sep. 16, 2014

(54) AUTOMATING SEQUENTIAL CROSS-APPLICATION DATA TRANSFER OPERATIONS

(75) Inventors: Blaine H. Dolph, Western Springs, IL (US); Robert J. Torres, Colleyville, TX (US)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 13/411,280

(22) Filed: Mar. 2, 2012

(65) Prior Publication Data

US 2013/0232494 A1    Sep. 5, 2013

(51) Int. Cl.
*G06F 9/46*    (2006.01)

(52) U.S. Cl.
USPC ............................. 718/100; 719/319; 719/329

(58) Field of Classification Search
None
See application file for complete search history.

(56) References Cited

U.S. PATENT DOCUMENTS

| | | | | |
|---|---|---|---|---|
| 5,491,784 | A * | 2/1996 | Douglas et al. | 715/810 |
| 6,208,345 | B1 * | 3/2001 | Sheard et al. | 715/853 |
| 7,260,777 | B2 * | 8/2007 | Fitzsimons et al. | 715/255 |
| 7,395,317 | B2 * | 7/2008 | Naick et al. | 709/213 |
| 7,624,353 | B2 | 11/2009 | Beumer | |
| 7,725,476 | B2 | 5/2010 | Waggoner | |
| 7,788,214 | B2 * | 8/2010 | Fernandez et al. | 707/602 |
| 7,926,064 | B2 * | 4/2011 | Fernandez et al. | 719/313 |
| 8,020,112 | B2 | 9/2011 | Ozzie et al. | |
| 8,042,057 | B2 | 10/2011 | Cossey et al. | |
| 8,191,003 | B2 * | 5/2012 | Brown et al. | 715/769 |
| 8,386,924 | B2 * | 2/2013 | Fitzsimons et al. | 715/249 |
| 2004/0181753 | A1 * | 9/2004 | Michaelides | 715/523 |
| 2005/0210401 | A1 | 9/2005 | Ketola et al. | |
| 2006/0250360 | A1 * | 11/2006 | Goodwin et al. | 345/163 |
| 2007/0061752 | A1 | 3/2007 | Cory | |
| 2008/0195969 | A1 * | 8/2008 | Brown et al. | 715/802 |
| 2011/0047506 | A1 | 2/2011 | Miller | |
| 2011/0125970 | A1 | 5/2011 | Commarford et al. | |
| 2011/0126093 | A1 | 5/2011 | Ozzie et al. | |
| 2011/0185298 | A1 | 7/2011 | Skatter et al. | |

OTHER PUBLICATIONS

Apperley et al., "Breaking the Copy/Paste Cycle: The Stretchable Selection Tool," Computer Science Department Waikato University, Hamilton, New Zealand, 2000, 8 pages.
Henshaw, "Clip Tool: A Convenience for Repetitive Clipboard Actions," IBM Technical Disclosure Bulletin, 37(3):305-306, Mar. 1994.

* cited by examiner

*Primary Examiner* — Van Nguyen
(74) *Attorney, Agent, or Firm* — Matthew H. Chung; Yee & Associates PC

(57) ABSTRACT

Illustrative embodiments disclose performing a task between software components. A computer executed process identifies a first region of a source software component as a source location for the task. The computer also identifies a second region of a target software component as a target location for the task. The computer responsively identifies a set of data in the source location. The computer determines a set of actions to perform the task between the source and the target software components. The set of actions to perform the task includes at least a first action to select a portion of the set of data in the source location, a second action to perform on the selected portion of the set of data that generates new data, and a third action using the new data in the target location. The computer performs the set of actions for the task.

19 Claims, 7 Drawing Sheets

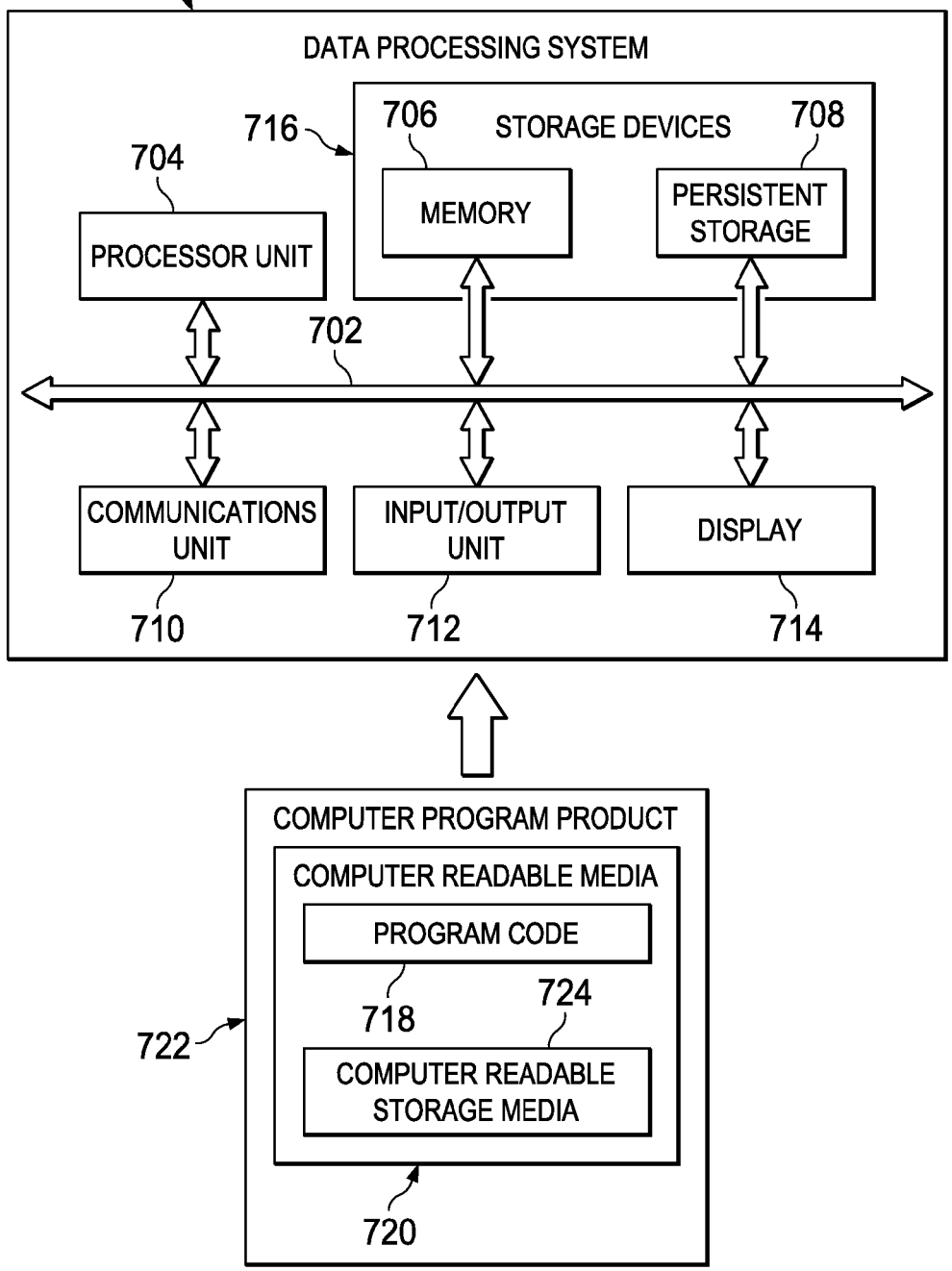

AUTOMATING SEQUENTIAL CROSS-APPLICATION DATA TRANSFER OPERATIONS

BACKGROUND

1. Field:

The disclosure relates generally to automating sequential cross-application operations and, more specifically, to automating operations to repetitively transfer data from one application to another.

2. Description of the Related Art

The proposed technique automates and implements a more timely and efficient process of integrating applications "on the fly," especially for sequential and repetitive clipboard operations from one application to another. An interactive integration feature is provided to rapidly integrate data between applications. This includes both transferring data and modifying the data being transferred.

A clipboard is a software tool that can be used for short-term data storage for data transfer between applications commonly used in "copy and paste" operations. Typically, it is part of a graphical user interface (GUI) environment implemented as a temporary data buffer accessible by most applications in the GUI environment. Clipboard operations are very time consuming and error-prone when many operations must be performed in sequence to select and transfer repetitive portions of data. Cross-application data transfer operations transferring data from one application to another application using clipboard operations often take a long time to implement and are subject to a high error rate. Other techniques, besides use of a clipboard, may be time consuming to configure and set up. These techniques can include setting up an import process to transfer data to a proper location and in a proper format, or a screen-scraping process to detect and copy data from a display screen. Prior methods attempting to automate the transfer process to repeat a sequence of steps to transfer multiple portions of data between applications are difficult to initiate and set up. Also, the prior art methods lack compatibility between applications from different software companies.

Therefore, it would be desirable to have a method and apparatus that takes into account at least some of the issues discussed above, as well as possibly other issues.

SUMMARY

In one illustrative embodiment, a computer performs a task between software components. A computer executed process identifies a first region of a source software component as a source location for the task. The computer also identifies a second region of a target software component as a target location for the task. Responsive to identifying the source location, the computer subsequently identifies a set of data in the source location of the source software component. The computer determines a set of actions to perform the task between the source software component and the target software component. The set of actions to perform the task includes at least a first action to select a portion of the set of data in the source location, a second action to perform on the selected portion of the set of data that generates new data, and a third action using the new data in the target location. The computer performs the set of actions for the task.

BRIEF DESCRIPTION OF THE SEVERAL VIEWS OF THE DRAWINGS

FIG. 7 is an illustration of a data processing system in accordance with an illustrative embodiment.

DETAILED DESCRIPTION

Figure 1:
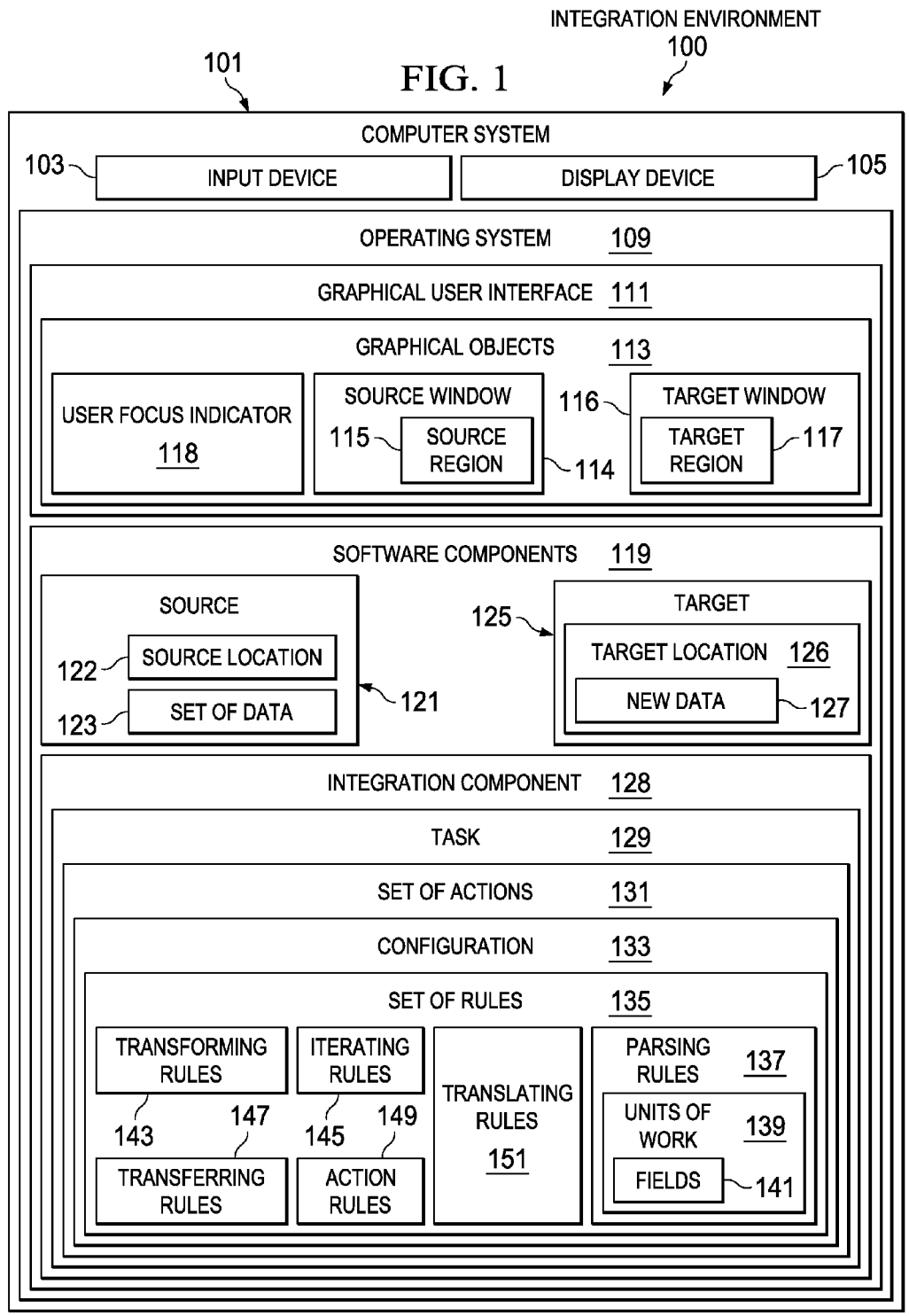
FIG. 1 is an illustration of a block diagram of integration environment in accordance with an illustrative embodiment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The manipulation of data in a data processing system is well known in the prior art. Data may be manipulated in many ways in a modern state-of-the-art data processing system including: data accessing, data encoding, data communications, data compression, data conversion, data entry, data exchange, data filing, data linking, data locking, data manipulation, data mapping, data modeling, data processing, data recording, data sorting, and data transferring. The large amounts of data that are available to the user of modern state-of-the-art data processing system often become overwhelming in magnitude and complexity. These situations may often arise in the creation and execution of multimedia presentations.

Data processing systems are capable of communicating information to users in many formats, including: text, graphics, sounds, animated graphics, synthesized speech, and video. Multimedia presentations employ a data processing system to combine such information formats into a coherent and comprehensive presentation to the user.

As a result of the increasing complexity of data processing systems and with the introduction of multimedia presentations, attempts have been made to simplify the interface between a user and the large amounts of data present within a modern data processing system. One example of an attempt to simplify the interface between a user and a data processing system is the utilization of a so-called graphic user interface (GUI) to provide an intuitive and graphical interface between the user and the data processing system. A GUI is an interface system, including devices by which a user interacts with a system, system components, and/or system applications via windows or view ports, icons, menus, pointing devices, etc.

Although GUIs have made manipulation of data easier for users in some instances, GUIs have created new problems. For example, a user working in an application frequently selects items from an application menu toolbar. This interaction will require the user to move a pointer via a mouse over a graphical object, such as a menu, icon, or control, to make a selection.

The term "mouse," when used in this document, refers to any type of operating system-supported graphical pointing device including, but not limited to: a mouse, track ball, touch pad, light pin, touch screen, and the like. A pointing device is typically employed by a user of the data processing system to interact with the data processing system's GUI. A "pointer" is an iconic image controlled by a mouse or other such device, and is displayed on the video display device of a data processing system to visually indicate to the user icons, menus, or other types of graphical objects that may be selected or manipulated.

With reference now to the figures and in particular with reference to FIG. 1, an illustration of a block diagram of an integration environment is depicted in accordance with an illustrative embodiment. It should be appreciated that FIG. 1 is only provided as an illustration of one implementation and is not intended to imply any limitation with regard to the environment in which different embodiments may be implemented. Many modifications to the depicted environment may be made.

As depicted, automated sequential data transfer operation environment 100 includes computer system 101. In this illustrative example, computer system 101 includes input device 103 used by a user to interact with computer system 101 and display device 105 to present data to a user. Input device 103 can include, for example, a computer mouse, touch screen, trackball, pointing stick, touchpad, and keyboard. As used herein, "computer system" means any type of data processing system, for example, a computer, laptop, notebook, mobile phone, tablet, and other suitable types of devices that have processor units configurable to display, manipulate, and process data.

As depicted, computer system 101 utilizes operating system 109 to function. As used herein, "operating system" means a set of programs for managing computer hardware resources and application software. In these illustrative examples, operating system 109 includes, for example, Linux®, Android®, iOS®, MAC OS X®, Microsoft Windows®, and any other system for managing computer hardware resources and application software. As used herein, "set of", when used with reference to items, means one or more items. For example, a set of programs is one or more programs.

As depicted, operating system 109 includes graphical user interface (GUI) 111, as encountered in a Windows® and MAC OS X® environment, and typically reacts to an input from a user on input device 103, for example, from a mouse, on computer system 101 to receive command and control user inputs. In these illustrative examples, graphical user interface 111 comprises various graphical objects 113 that can include, for example, source window 114. Source window 114 can include at least one source region 115. Graphical user interface 111 can also include, for example, target window 116. Target window 116 can include at least one target region 117. Graphical user interface 111 also can include user focus indicator 118.

As depicted, source window 114 and target window 116 are types of graphical user interface 111 used on most personal computers allowing a user to easily access, configure, modify features of, and otherwise interact with ones of software components 119 using operating system 109. Source window 114 interfaces with source 121. Source 121 is a first one of software components 119. Source 121 includes source location 122, which is a portion of source region 115, displaying, and providing an interface with at least a portion of set of data 123, which in these illustrative examples includes a portion of set of data 123 to transfer. Source 121 can also be said to host set of data 123 and generally can modify and/or utilize set of data 123. Target window 116 interfaces with target 125. Target 125 is a second one of software components 119. Target 125 includes target location 126, which is a portion of target region 117, displaying, and providing an interface with any data transferred into target location 126. Target location 126 includes new data 127, which is at least a portion of set of data 123 inserted into target location 126 that was modified during transfer.

In these illustrative examples, user focus indicator 118 refers to a graphical indication in graphical user interface 111 of the current active software component. User focus indicator 118 can indicate which one of software components 119, among several running software components 119, that is currently in use by a user or active on computer system 101. User focus indicator 118 can include, for example, a pointer, "top" window, that is, a top most window displayed in a cascaded display of windows, a highlighted border, a color indicator in that portion of the display, a pop up, and/or any other graphical indication of the current focus of the user readily perceived in graphical user interface 111.

As depicted, computer system 101 includes software components 119, which further includes source 121 and target 125. Source 121 is a first one of software components 119 containing set of data 123 to transfer. Target 125 is a second one of software components 119 receiving set of data 123 transferred from source 121. In these illustrative examples, integration component 128 is a third one of software components 119 used to transfer set of data 123 from source 121 into target 125 for integration into target 125.

In these illustrative examples, software components 119, like source 121 and target 125, can include productivity programs and entertainment programs as well as other application programs and software available on computer system 101 and supporting or requiring set of data 123. For example, set of data 123 may be a customer database maintained in an accounting spreadsheet application. As another example, set of data 123 may be a list of inventory items maintained by a warehousing and shipping control application. Set of data 123 hosted in source 121 may be required by target 125 requiring the transfer. For example, source 121 may comprise an accounting spreadsheet application while set of data 123 is a customer database maintained in the accounting spreadsheet. Target 125 may comprise a marketing application requiring the customer database to generate a personalized marketing database. Using integration component 128, the customer database can be transferred from source 121 accounting spreadsheet and integrated into target 125 marketing application to generate the personalized marketing database.

As depicted, integration component 128 is one of software components 119. Integration component 128 can be used to perform iterations of different actions to repeat to transfer and integrate data from source 121 to target 125. "Iteration" refers to a repeated sequence of identical computer processing steps or commands, which can be referred to generally as actions. For example, to transfer and integrate set of data 123 from source location 122 into target location 126 can require executing several actions in sequence to transfer and integrate a portion of set of data 123. The steps collectively taken to transfer and integrate a first portion of set of data 123 make up a first iteration. The iteration of actions must be repeated until set of data 123 is completely transferred and integrated from source 121 to the target 125.

As depicted, integration component 128 implements cross-application data transfer operations as task 129. Integration component 128 performs task 129 to transfer and integrate set of data 123 from source 121 into target 125. In these illustrative examples, task 129 includes set of actions 131 forming a sequence. Integration component 128 executes and completes task 129 using set of actions 131. More specifically, task 129 comprises a sequence selected from set of actions 131 to transfer, modify, and integrate data between software components 119 source 121 and target 125.

In these illustrative examples, set of actions 131 selected by a user are performed in a sequence on set of data 123 to perform the transfer between source 121 and target 125. Set of actions 131 can include all the computer processing and command steps to transfer, modify, and integrate set of data 123. "Transfer", and variants of the term, as used herein can more generally refer to transferring, modifying, and integrating.

Configuration 133 is a portion of integration component 128 used to configure set of rules 135. Configuration 133 configures set of rules 135 in integration component 128 to perform set of actions 131. In these illustrative examples, configuration 133 allows a user access to set of rules 135 to select applicable and desired ones of set of rules 135 to provide instructions for handling ones of set of data 123 to perform task 129. A user uses configuration 133 to select ones of set of rules 135 to govern the transfer of set of data 123 associated with source 121 into target 125.

For example, as depicted, set of rules 135 can include parsing rules 137 to apply to set of data 123 from source 121. Parsing rules 137 can include instructions defining units of work 139 and further how to break units of work 139 down into one or more fields 141. Thus, parsing rules 137 can specify how set of data 123 is segmented and organized into one or more fields 141 for integration into target 125. Transforming rules 143 can include instructions for changing each of fields 141 from a first format into a second format during transfer to target 125. Thus, set of data 123 is transformed into new data 127 to insert into target location 126. For example, set of data 123 maintained in source 121 may require modification to change set of data 123 from one data format into another. As one example, it may be necessary to change data in a numeric field representing an account, 00123456, into the actual account number, 12345-6 in this example. As another example, a locale for source 121 may be different than a locale for target 125.

In this example, a parsing rule may require translation from the source locale to the target locale during the transfer of set of data 123 from source 121 to target 125. Further, even though a difference between source and target locale may exist, a user may have selected a parsing rule to translate the locale of set of data 123 when transferring set of data 123 from source 121 to target 125. In these illustrative examples, "locale", with reference to data, means a set of preferences for number format, character case conversion, date and time format, string collation sequence, currency format, and any other suitable preferences for defining a difference between the representation of set of data 123 in source 121 and target 125.

Iterating rules 145 can specify how to select each of units of work 139 for transfer from source 121 to target 125 in a sequence of actions repeated till all of set of data 123 is transferred. For example, iterating rules 145 can include how to proceed to a next line, next cell, or next page to select each ones of units of work 139 during each transfer. As one example, set of data 123 can be arranged in an array of data in a sequence of columns and rows. Iterating rules 145 for such an array would specify how to proceed in going to the next cell in the array sequence to select and transfer the data from the cell in source 121 to the target 125.

As depicted, transferring rules 147 specify how units of work 139 are transferred into target 125 of software components 119. This can include mapping data fields in target 125 to insert units of work 139. For example, target 125 may include a multi-field form requiring parsed fields 141 from source 121 to transfer into fields mapped onto the form at target 125. Thus, transferring rules 147 correlate fields 141 of units of work 139 into mapped fields 141 in target 125. Action rules 149 can specify the actions to take in target 125 to complete transfer or integration of one or more of units of work 139. For example, to complete an operation to integrate set of data 123, integration component 128 may require selecting one or more actions of paste, enter, execute, go, save, submit, next, send, refresh, perform, integrate, and any other action to complete the transfer and integration of set of data 123. In these illustrative examples, translating rules 151 may specify how to translate units of work 139 from a first data form in source 121 into a second data form in target 125. For example, this rule can direct modifying set of data 123 by translating set of data 123 from one language into another and/or from one character set into another. In this example, a character set for Spanish used in set of data 123 may require translating into an American English character set. Further, in this example, the language used in set of data 123 may require translating words and phrases in set of data 123 from Spanish into English. In these illustrative examples, the modification of set of data 123 changes set of data 123 into new data 127.

Figure 2:
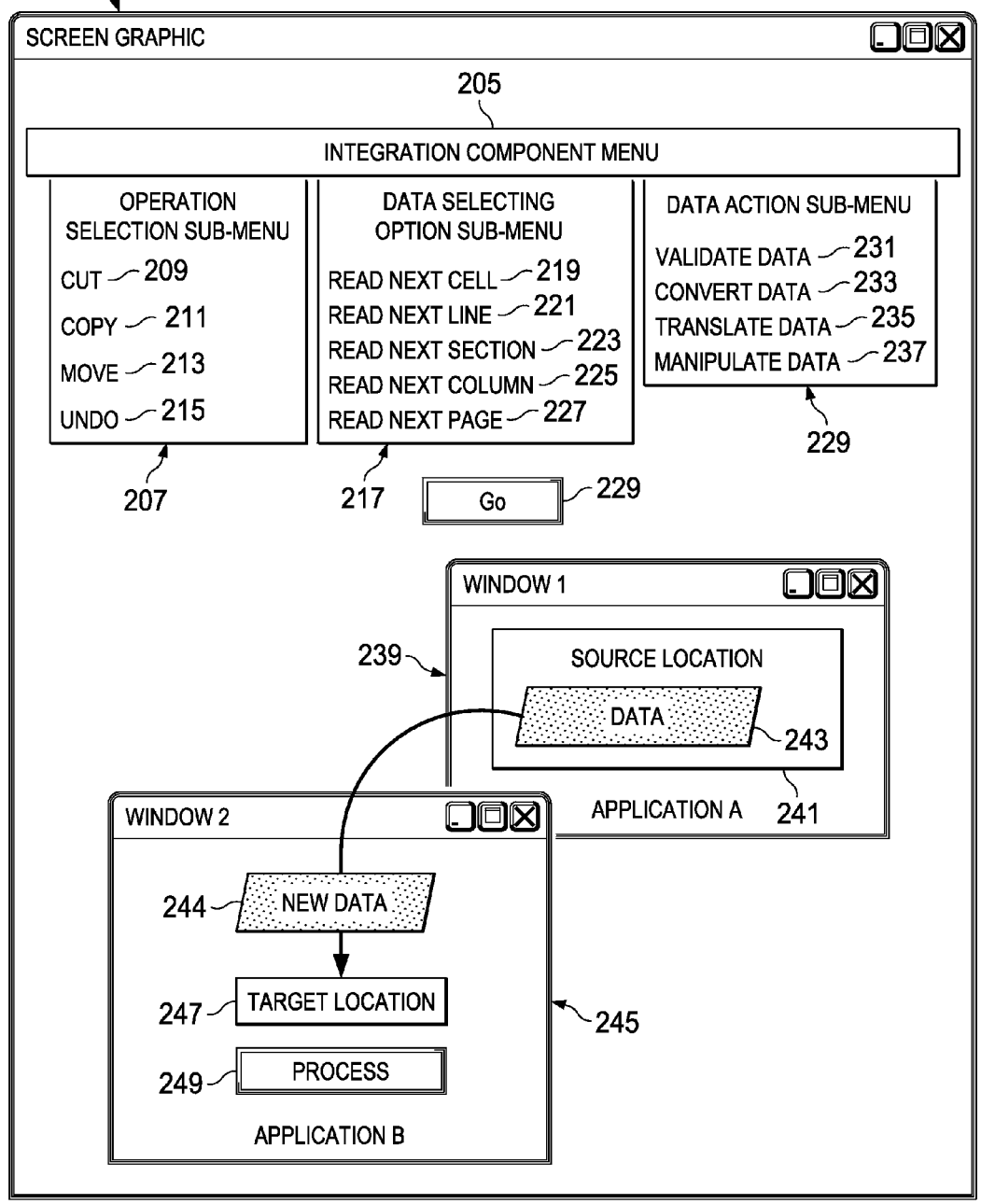
FIG. 2 is an illustration of a screen graphic on a computer system for an automated sequential data integration process in accordance with an illustrative embodiment.

Turning now to FIG. 2, an illustration of a screen graphic on a computer system for an automated sequential data integration process in accordance with an illustrative embodiment is depicted. It should be appreciated that FIG. 2 is only provided as an illustration of one implementation and is not intended to imply any limitation with regard to the computer displays in which different embodiments may be implemented. Many modifications to the depicted computer screen may be made.

As depicted, screen graphic 200 shows an illustrative example of a view of a computer screen implemented in graphical user interface 111. For example, Windows® and MAC OS X® present graphical user interface 111 to interact with and control a computing device, like computer system 101. As depicted, with reference to FIG. 1, screen graphic 200 on computer system 101 comprises a number of features providing visual data and control interfaces to a user of computer system 101 using graphical user interface 111. Screen graphic 200 can comprise integration component menu 205, which can graphically display various sub-menus for controlling integration component 128. Integration component menu 205, in these illustrative examples, can comprise a drop down menu, pop-up window, dialog box, or some other graphical object for receiving inputs to operating system 109 to utilize and control integration component 128. The examples presented for integration component menu 205 are illustrative only and are not limited, so fewer or more operations can be available.

As depicted, integration component menu 205 includes operation selection sub-menu 207. In these illustrative examples, operation selection sub-menu 207 presents selectable operations to perform on set of data 123 associated with source 121 to transfer portions of set of data 123 to target 125. For example, operation selection sub-menu 207 includes cut 209, copy 211, move 213, and undo 215. One or more of these operations may be selected through user input to operation selection sub-menu 207. More or fewer operations may be presented.

In these illustrative examples, the operation cut 209 removes selected portions of set of data 123 from its original location associated with source 121 to transfer to target 125. The operation copy 211 creates a duplicate of selected portions of set of data 123 from its original location associated with source 121 to transfer to target 125. The operation move 213 is a variant of the operation cut 209 and transfers set of data 123 along with associated reference data. For example, move 213 can transfer associated reference metadata along with selected portions of set of data 123 to target 125. In contrast, the operation cut 209 transfers only the selected portions of set of data 123 itself, leaving associated reference metadata behind. Operation undo 215 erases a last change performed in source 121, reverting set of data 123 to an older state or older version of set of data 123. The transfer of set of data 123 can also utilize a clipboard on operating system 109 to buffer portions of set of data 123 during transfer.

As depicted, data selecting option sub-menu 217 provides options to select next portions of set of data 123 from source 121. Portions of set of data 123 selected are then transferred to target 125 during repeated operations in a sequence. For example, data selecting option sub-menu 217 can include read next cell 219, read next line 221, read next section 223, read next column 225, read next page 227, and any other option to select data from a next location in source 121 to include in a sequence to transfer set of data 123.

In these illustrative examples, the option read next cell 219 advances a selection input, for example, a pointer, cursor, and any other user focus indicator 118 used to select data, to a next cell in source 121, for example, to the next cell in a table. A selected operation from operation selection sub-menu 207 is then performed on the portion of set of data 123 in the cell. The option read next line 221 advances a selection input, for example a pointer, cursor, and any other user focus indicator 118 used to select data, to the next line in source 121, for example, to the next line of a document. A selected operation from operation selection sub-menu 207 is then performed on the portion of set of data 123 on the next line. The option read next section 223 advances a selection input, for example, a pointer, cursor, and any other user focus indicator 118 used to select data, to the next section in source 121, for example, the next section in a document. A selected operation from operation selection sub-menu 207 is then performed on the portion of set of data 123 in the next section. The option read next column 225 advances a selection input, for example, a pointer, cursor, and any other user focus indicator 118 used to select data, to the next column in source 121, for example, the next column of a table. A selected operation from operation selection sub-menu 207 is then performed on the portion of set of data 123 in the next column. The option read next page 227 advances a selection input, for example, a pointer, cursor, and any other user focus indicator 118 used to select data, to the next page in source 121, for example, in the next page of a multi-page document. A selected operation from operation selection sub-menu 207 is then performed on the portion of set of data 123 on the next page. The examples presented for data selecting option sub-menu 217 are illustrative only and are not limited, so fewer or more operations can be available.

As depicted, data action sub-menu 229 provides data actions to perform while transferring portions of set of data 123 in a repeated sequence. In these illustrative examples, data action sub-menu 229 presents actions to select to perform on selected portions of set of data 123 making up units of work 139 during transfer. In these illustrative examples, data action sub-menu 229 includes validate data 231, convert data 233, translate data 235, and manipulate data 237.

The action validate data 231 can specify how to check each of units of work 139 as the data is transferred to ensure correctness, meaningfulness, and security. For example, before executing an action to insert each of units of work 139 into target 125, a check to ensure the data is consistent can be performed, like checking for a number value or confirming a data field for gender is either an "M" or an "F." The action executed may also check for integrity of units of work 139, for example, using a hash value check. The action convert data 233 can specify how to convert each of units of work 139 from one data format to another during transfer. For example, set of data 123 in source 121 may need to be converted from the HyperText Markup Language (HTML) data format into the American Standard Code for Information Interchange (ASCII) to use in target 125 as new data 127. As another example, set of data 123 in Microsoft Works® data format in source 121 may require converting into a Comma Separated Values (CSV) data format to use in target 125.

In these illustrative examples, the action translate data 235 can specify how to translate units of work 139 from one data format into another. For example, set of data 123 in source 121 may require translating from binary code into hexadecimal code, translated from a Cyrillic character set into an English character set, or from the Japanese language into English. The action manipulate data 237 can specify how to manipulate each of units of work 139 in a specific way dictated by a user. For example, a data value in source 121 may require multiplying by a constant, may require rounding, may need to be reversed, or may require rearranging, as just a few examples of data manipulation, required to generate new data 127 for use in target 125. The examples presented for data action sub-menu 229 are illustrative only and are not limited, so fewer or more actions may be available.

As depicted, window 1 239 interfaces with application A, which comprises source 121. As depicted, window 1 239 contains at least a portion of set of data 123 in source location 241 available to transfer to target 125. Source location 241 comprises source region 115 of window 1 239 that can comprise a cell of an array of data, a cell of a table of data, a line of text comprising data to be transferred, and any other presentations of data in application A selected using integration component 128. Data 243 is a portion of set of data 123 selected from application A in window 1 239 to transfer to window 2 245. For example, data 243 can comprise a line of text, a numerical value in a data cell, a graph, data from a graph, a table, data from a table, an entry in a data array, and any other logical presentation of data in application A in window 1 239. During transfer, data 243 can be modified or converted according to set of rules 135 into new data 244. For example, selections convert data 233, translate data 235, and manipulate data 237 from data action sub-menu 229 performed on data 243 will generate new data 244.

Window 2 245 interfaces with application B, which comprises target 125. Window 2 245 includes target location 247 into which new data 244 is transferred. Target location 247 can comprise, for example, an entry field in target 125 for data 243. In these illustrative examples, integration component 128 transfers data 243 from source location 241 into target location 247 as new data 244 utilizing various selected ones of set of actions 131, which includes selections from integration component menu 205.

After inserting new data 244 into target location 247, integration component 128 can activate process 249 to process and use new data 244 according to the purpose and usage of application B. For example, a billing application may use new data 244 to generate a bill, with transferred set of data 123 used to generate a set of bills. As another example, an accounting application may use data 243 to update a business account of a corporation by integrating new data 244 representing financial information from several subsidiaries. Thus, integration component 128 can integrate new data 244 into target location 247 for use in a process initiated with process 249.

Figure 3:
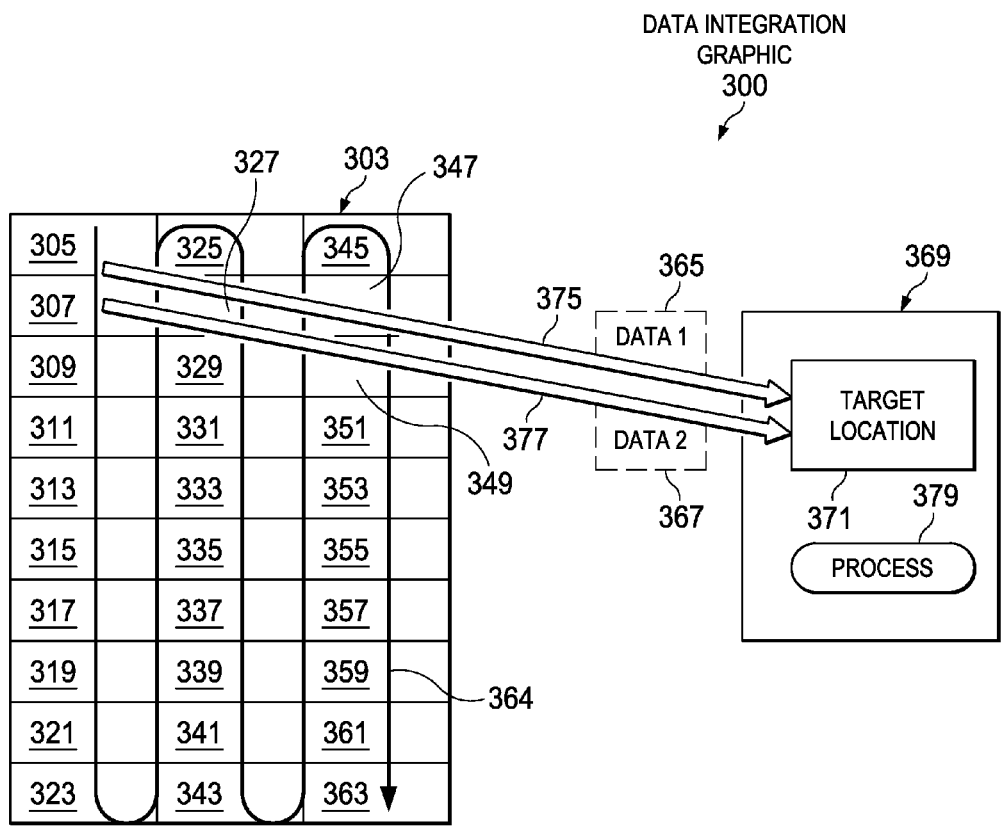
FIG. 3 is a illustration for an automated sequential data integration process transferring data from a first application to a second application in accordance with an illustrative embodiment.

FIG. 3 depicts an illustration for an automated sequential data integration process transferring data from a first application to a second application in accordance with an illustrative embodiment. It should be appreciated that FIG. 3 is only provided as an illustration of one implementation and is not intended to imply any limitation with regard to the computer displays in which different embodiments may be implemented. Many modifications to the depicted process may be made.

As depicted, with reference to FIG. 1, data integration graphic 300 shows an illustrative example of the transfer of data from a data table or array of data 303 as performed by integration component 128. In this illustrative example, array of data 303 comprises a three column by ten row array of data 303 comprised of 30 cells. Cells 305-363 each contain at least one data element to transfer from one application into another. For example, as depicted, cell 305 contains data 1 365 and cell 307 contains data 2 367. Path 364 depicts the order in which integration component 128 selects cells 305-363 to repeat in a sequence of set of actions 131 selected to transfer array of data 303 to application interface 369. As depicted, data 1 365 transfers into target location 371 in application interface 369. For example, data 1 365 transfers from window 1 239 into window 2 245, application B, of FIG. 2, which represents target 125.

In these illustrative examples, each of cells 305-363 comprises source location 241 selected in sequence to transfer data contents into target location 371. Target location 371 comprises target region 117 including a plurality of data entry field in target 125 to receive array of data 303 contained in cells 305-363, which in this example may be a data field in application B. A user may manually perform integration process to transfer the first data element data 1 365 from cell 305 in transfer operation 375. However, next transfer operation 377, and subsequent transfers of array of data 303 from cells 309-363, occurs automatically, performed by integration component 128 as a sequence selected from set of actions 131. Transfer operation 377 transfers the second data element data 2 367 from cell 307. Set of actions 131 are performed in sequence to transfer data in cells 307-363.

In these illustrative examples, transfer operations 375 and 377 include at least one of actions 231-237 selected from data action sub-menu 229, and at least one of actions 217-227 selected from data selecting option sub-menu 217. These actions are performed on the data during transfer operations 375 and 377. As each transfer operation is performed, integration component 128 executes process 379 in target 125, or, as in this example, in application B of FIG. 2, to either complete integration of the data or execute an operation with the data using application B. For example, while a "paste" operation may insert data into application B, a "submit" operation, executed as process 249 according to the use of application B, may be required in addition to "paste" to fully integrate the data into application B. However, a "paste" operation may fully integrate data into application B, while a "submit" operation, executed as process 249 according to the use of application B, may utilize the integrated data in a data processing operation according to the purpose and usage of application B. Of course, data 1 365 and data 2 367 may be modified during transfer operations 375 and 377 before integration into target location 371.

FIGS. 2 and 3 are illustrative only. Other embodiments may transfer data from multiple application windows into a single application window, from a single application window into multiple application windows, and from multiple application windows into multiple application windows.

Figure 4:
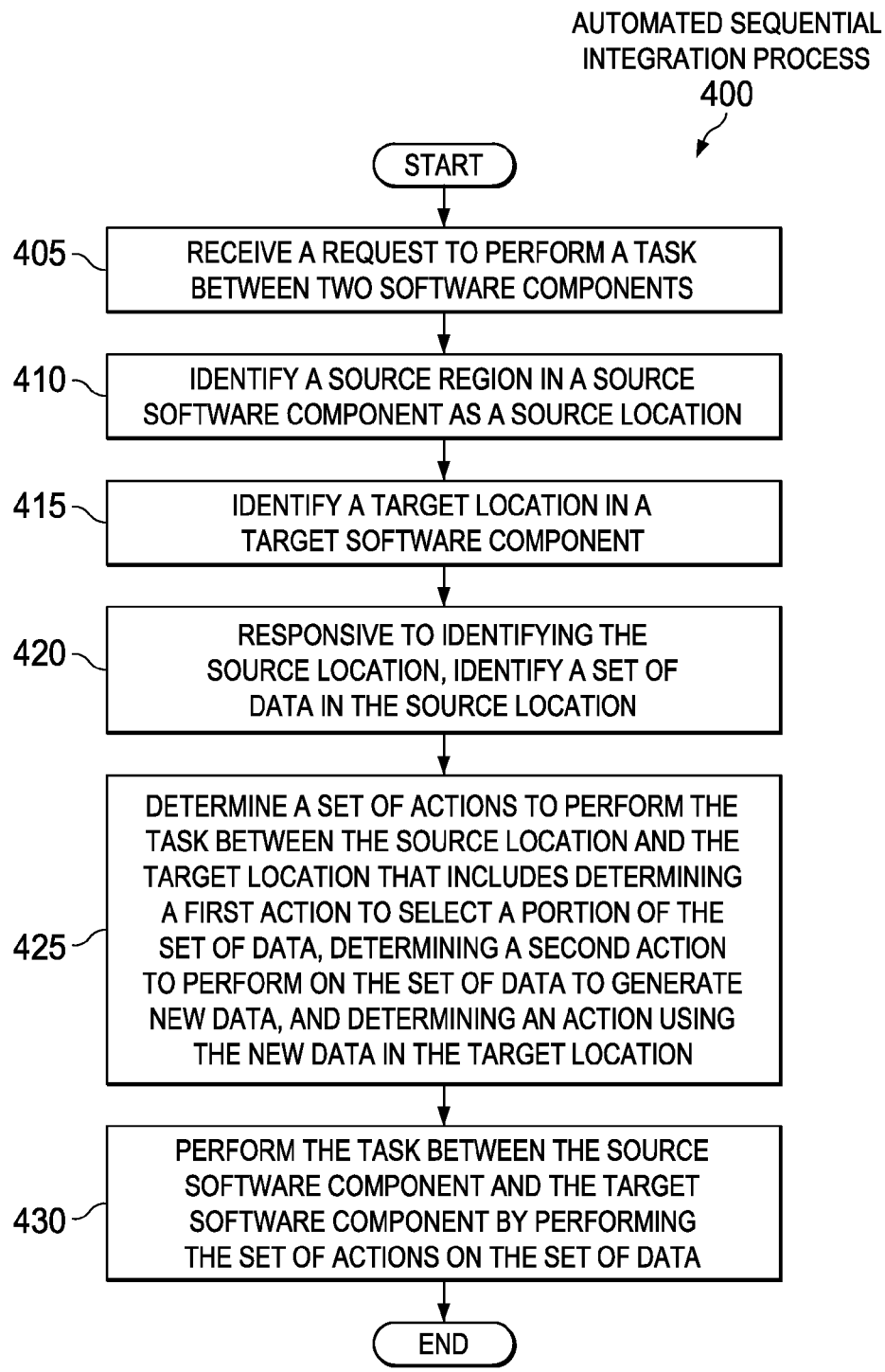
FIG. 4 is an illustration of a flowchart of an automated sequential data integration process in accordance with an illustrative embodiment.

FIG. 4 depicts an illustration of a flowchart of an automated sequential data integration process in accordance with an illustrative embodiment. It should be appreciated that FIG. 4 is only provided as an illustration of one implementation and is not intended to imply any limitation with regard to the computer displays in which different embodiments may be implemented. Many modifications to the depicted process may be made.

As depicted, with reference to FIG. 1, automated sequential integration process 400 can be implemented by integration component 128. Automated sequential integration process 400 begins with integration component 128 receiving a request to perform task 129 between two software components 119 (step 405). Task 129 comprises transferring set of data 123 from one of software components 119 to another. Integration component 128 then identifies source region 115 in source 121 as source location 122 (step 410). Integration component 128 next identifies target location 126 in target 125 (step 415). Responsive to identifying source location 122, integration component 128 identifies set of data 123 in source location 122 (step 420).

As depicted in step 425, integration component 128 determines set of actions 131 to perform task 129 between source location 122 and target location 126. The determined set of actions 131 includes determining a first action to select a portion of set of data 123, determining a second action to perform on set of data 123 to generate new data 127, and determining an action using new data 127 in target location 126.

In these illustrative examples, determining a first action to select a portion of set of data 123 can include applying parsing rules 137 to parse source location 122 to indentify units of work 139 in set of data 123 and break down units of work 139 into fields 141. The first action may also include applying transferring rules 147 to specify how units of work 139 are transferred into target location 126. For example, it may be necessary to map data fields in target location 126 to parsed fields 141 from source 121. Iterating rules 145 must also be determined to specify how to proceed in source location 122 to select each of units of work 139 to transfer from source 121 into target 125 in a sequence of actions. Integration component 128 may also perform interface operations selected by the user on graphical objects 113 of source location 122 to determine and acquire set of data 123 to transfer. Additionally, determining set of actions 131 may require applying an operation selected from operation selection sub-menu 207 in FIG. 2. For example, cut 209 operation may be used to remove a portion of set of data 123 for transfer, or copy 211 operation may be used to copy a portion of set of data 123 to transfer.

In these illustrative examples, determining the second action can include applying transforming rules 143 for changing each of fields 141 from a first format into a second format during transfer to target location 126 to generate new data 127. Thus, set of data 123 may be transformed into new data 127 to insert into target location 126. For example, set of data 123 maintained in source 121 may require modification to change set of data 123 from one data format into another. For example, it may be necessary to change the format of set of data 123 from "Doe, John Jones" into "John J. Doe." As another example, it may be necessary to change data in a numeric field representing an account, 00123456, into the actual account number, 12345-6. As another illustrative example, the second action determined may be to apply translating rules 151 required to translate units of work 139 into new data 127. Translating rules 151 may direct translating from one language into another language or from one character set into another character set. Multiple ones set of rules 135 may be determined as well. For example, it may be necessary to both translate and transform "Doe, John Jones," originally in Unicode and a Cyrillic character set, into "John J. Doe," in ASCII and English character set.

Additionally, determining the second action can include applying selections from data action sub-menu 229. Convert data 233 can specify how to convert each of units of work 139 from one data format to another during transfer. This could specify a code or format conversion, for example, from HyperText Markup Language (HTML) data format into the American Standard Code for Information Interchange (ASCII), or converting between units of measure, for example, from pounds into ounces or miles into meters to use in target 125 as new data 127. As another example, set of data 123 in Microsoft Works® data format in source 121 may require converting into a Comma Separated Values (CSV) data format to use in target 125.

In these illustrative examples, determining the third action can also include various actions to insert and integrate units of work 139 into target location 126. For example, to complete an operation to integrate set of data 123, integration component 128 may select one or more actions of paste, enter, execute, go, save, submit, next, send, refresh, perform, integrate, and any other action required to complete the transfer and integration of units of work 139. This may also require integration component 128 to first perform an action using operating system 109, like using paste to insert each of units of work 139, followed by activating a process in target 125, like using process 249 in FIG. 2, to process and use units of work 139 inserted into target location 126 according to the purpose and usage of target 125.

Finally, as depicted, integration component 128 performs task 129 between source 121 and target 125 by performing set of actions 131 on set of data 123 (step 430). This can include performing each of the determined actions in step 425 in sequence till integration component 128 completes task 129 on all of set of data 123. The sequence of the determined ones of set of actions 131 can be selected by the user or determined by logic in integration component 128 on how to apply selected ones of set of rules 135 to accomplish set of actions 131. The process then ends.

Figure 5:
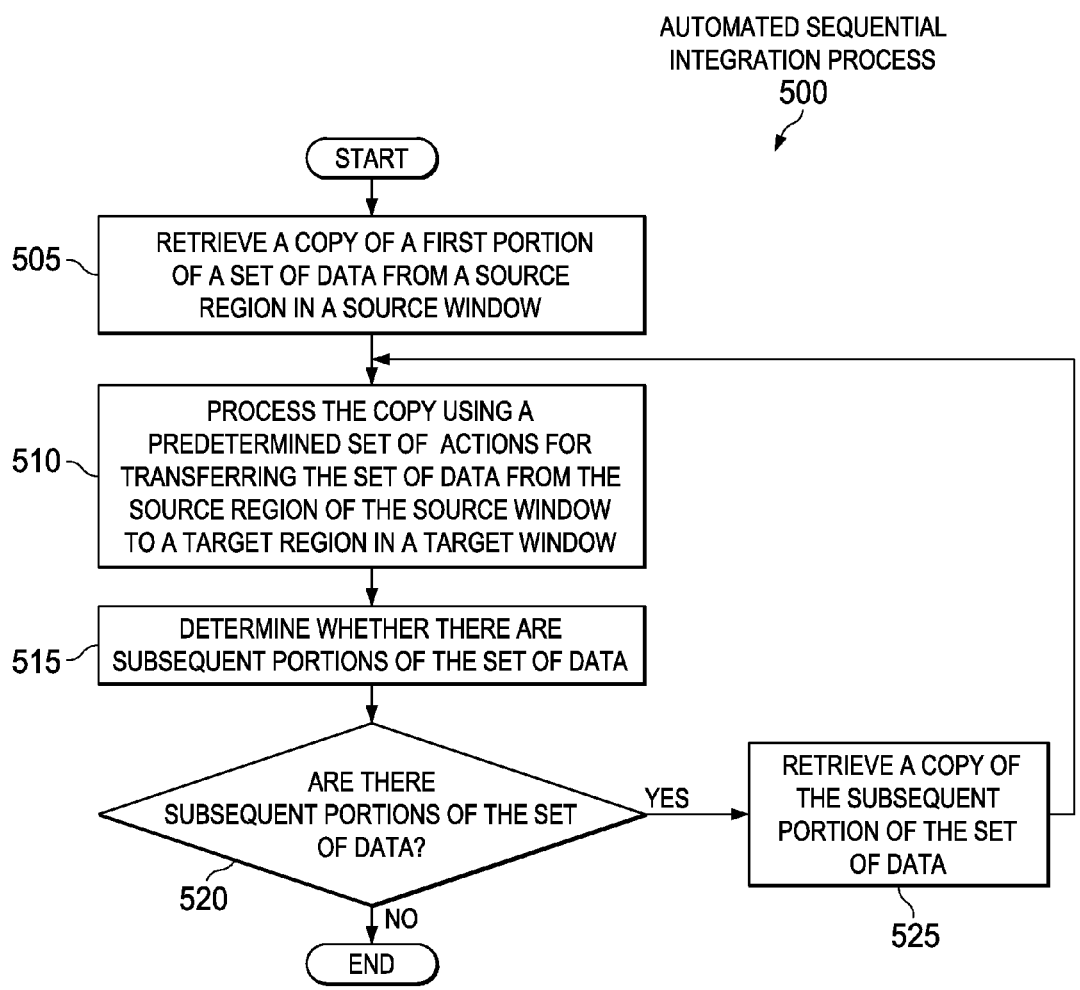
FIG. 5 is an illustration of a flowchart of an automated sequential data integration process in accordance with an illustrative embodiment.

FIG. 5 depicts an illustration of a flowchart of an automated sequential data integration process in accordance with an illustrative embodiment. It should be appreciated that FIG. 5 is only provided as an illustration of one implementation and is not intended to imply any limitation with regard to the computer displays in which different embodiments may be implemented. Many modifications to the depicted process may be made.

As depicted, with reference to FIG. 1, automated sequential integration process 500 can be implemented by integration component 128. Integration component 128 retrieves a copy of a first portion of set of data 123 from source region 115 in source window 114 (step 505). This can include using selected ones of set of rules 135 in integration component 128. Integration component 128 then processes the copy using a predetermined set of actions 131 for transferring set of data 123 from source region 115 of source window 114 to target region 117 in target window 116 (step 510). This can be accomplished, for example, by integration component 128 simulating command inputs to integrate the copy of a portion of set of data 123 into target region 117, the target location 126, and thus execute selected ones of set of rules 135 for the transfer. For example, various simulated user inputs can be implemented to extract the portion of set of data 123. Further, in this example, integration component 128 can determine units of work 139 from the extracted portion of set of data 123, perform any required modifications to generate units of work 139 in the proper format, insert modified units of work 139 into target location 126, and finally integrate units of work 139 into target 125. As depicted, integration component 128 next determines whether there are subsequent portions of set of data 123 (step 515). In step 520, if there are subsequent portions of set of data 123, integration component 128 directs the process to proceed to step 525, where integration component 128 retrieves a copy of the subsequent portion of set of data 123. Integration component 128 then returns to step 510. If there are no subsequent portions of set of data 123 in step 520, the process ends.

Figure 6:
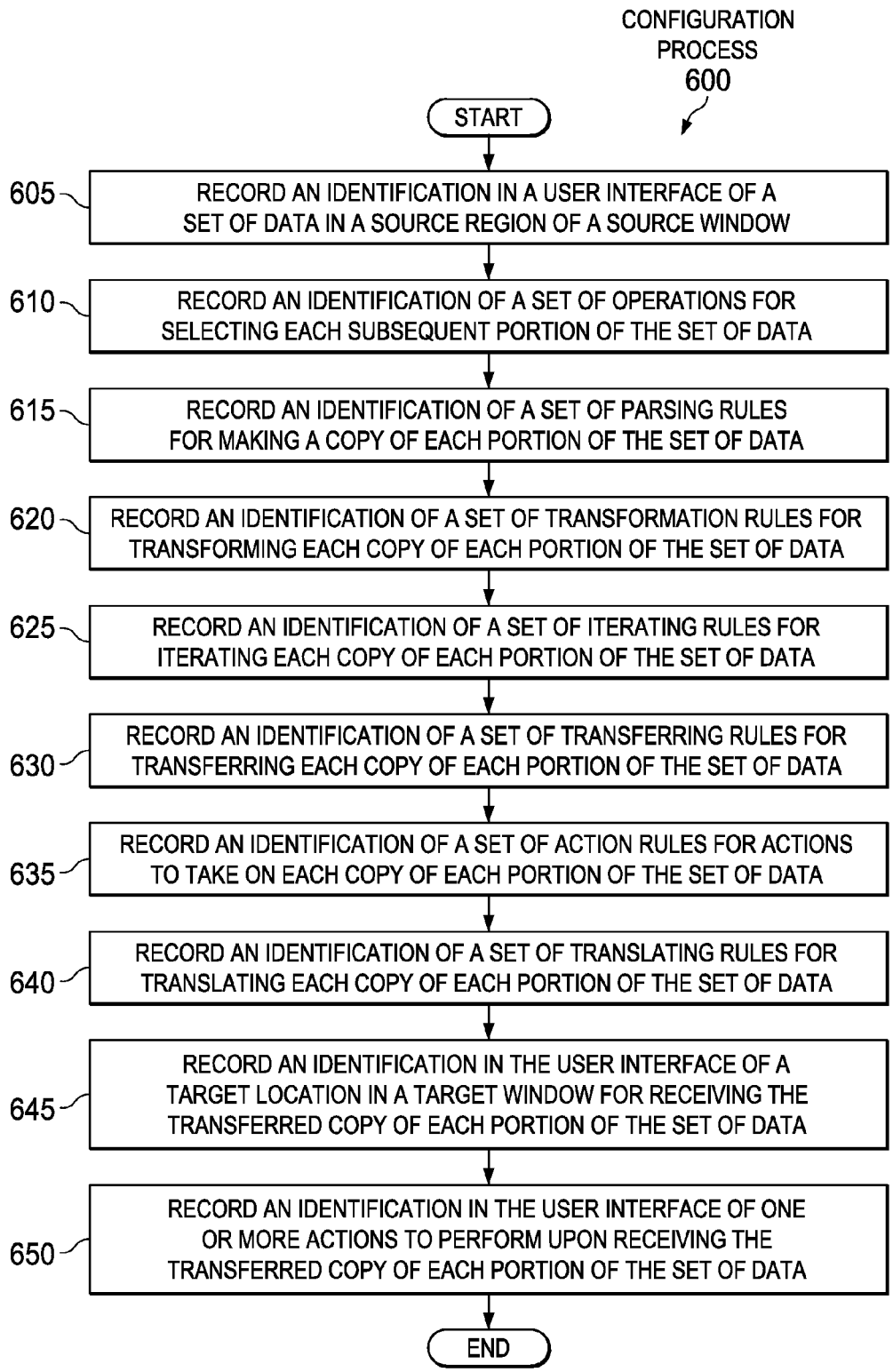
FIG. 6 is an illustration of a flowchart of a configuration process of the automated sequential data integration process in accordance with an illustrative embodiment.

Turning now to FIG. 6, an illustration of a flowchart of a configuration process of the automated sequential data integration process in accordance with an illustrative embodiment is depicted. It should be appreciated that FIG. 6 is only provided as an illustration of one implementation and is not intended to imply any limitation with regard to the computer displays in which different embodiments may be implemented. Many modifications to the depicted process may be made.

As depicted, with reference to FIG. 1, configuration process 600 can be implemented by integration component 128 to perform step 505 of FIG. 5 or as part of step 435 in FIG. 4. In these illustrative examples, configuration process 600 can begin when integration component 128 is prompted by a user to configure task 129 using integration component 128. As depicted, integration component 128 records an identification in a user interface of set of data 123 in source region 115 of source window 114 (step 605). In these illustrative examples, integration component 128 next records an identification of a set of operations for selecting each subsequent portion of set of data 123 (step 610). Step 610 can include, for example, selections from integration component menu 205 in FIG. 2.

In these illustrative examples, configuration process 600 can include setting rules from set of rules 135. As depicted, integration component 128 can record an identification of a set of parsing rules 137 for making a copy of each portion of set of data 123 (step 615). Parsing rules 137 for set of data 123 can include defining units of work 139 into one or more fields 141 of data. Set of data 123 can be in any software data format in source 121. As just a few examples, source 121 can contain set of data 123 in a Word® document, an Excel® spreadsheet, a PowerPoint® graph or table, a comma delimited text file, or a log file. This rule choice specifies how to define units of work 139 into fields 141 from set of data 123. For example, units of work 139 can comprise one or more fields 141 in set of data 123 or a string of data that requires parsing into fields 141. Each of units of work 139 can be a single cell from a source spreadsheet, a line of text from a text file containing sub-fields of data within it, and any other structured data format which may require use of parsing rules 137. In defining each of units of work 139, each of fields 141 in units of work 139 can receive a designation, for example, Field 1, Field 2, etc.

As depicted, integration component 128 can record an identification of a set of transformation rules 143 for transforming each copy of each portion of set of data 123 (step 620). Transforming rules 143 can specify how to transform each of fields 141 in units of work 139 into a new format. For example, it may be necessary to change a phone number into a standard format using regular expressions, for example, from "1234567890" into "(123) 456-7890." As another example, an account number may require changing from "AB-00123456" into "B12345-6." As another example, it may be necessary to reformat data indicating an email address, "JOESMITH" for example, into the actual email address of joesmith@emailservice.com.

As depicted, integration component 128 can record an identification of a set of iterating rules 145 for iterating each copy of each portion of set of data 123 (step 625). Iterating rules 145 can specify how to iterate over each of fields 141 of units of work 139. For example, this may include "go to the next cell", "go to the next line", or some other similar command to proceed to the next source location 122 in source 121 containing the next one of units of work 139.

As depicted, integration component 128 can record an identification of a set of transferring rules 147 for transferring each copy of each portion of set of data 123 (step 630). Transferring rules 147 can specify how fields 141 parsed by parsing rules 137 are inserted into target location 126 of target 125. For example, target 125 may comprise a web page containing a multi-field form. The selected transferring rules 147 can map fields 141 defined in parsing rules 137 instructions to correlate to fields 141 making up target location 126 in target 125.

As depicted, integration component 128 can record an identification of a set of action rules 149 for actions to take on each copy of each portion of set of data 123 (step 635). Action rules 149 can specify what actions to take in target 125 to complete transfer and integration of each of units of work 139. One or more actions may be required to insert and integrate each of units of work 139. For example, on a web page this could include both a "paste" operation and selecting a "submit" icon on the application interface. In other illustrative examples, only a singular "paste" or similar operation may be required. Other illustrative examples of actions include paste, enter, execute, go, save, next, send, submit, refresh, perform, integrate, and any other input for one or more of action rules 149 to take on units of work 139. Furthermore, this could include identical actions in tandem, for example, two "paste" operation in sequence.

As depicted, integration component 128 can record an identification of a set of translating rules 151 for translating each copy of each portion of set of data 123 (step 640). Translating rules 151 can specify how to translate units of work 139 for use in target 125. For example, units of work 139 of set of data 123 may require translating from one data format into another for use in target 125. This can include translating from one character set to another, for example, from a Cyrillic or Spanish character set into an English character set, and/or from one language to another, for example, from Chinese into English.

As depicted, integration component 128 can record an identification in the user interface of target location 126 in target window 116 for receiving the transferred copy of each portion of set of data 123 (step 645). In these illustrative examples, this can include applying parsing rules 137, transforming rules 143, transferring rules 147, action rules 149, and translating rules 151. Finally, integration component 128 can record an identification in the user interface of one or more actions to perform upon receiving the transferred copy of each portion of set of data 123 (step 650). This can include, for example, selecting "GO" 229 graphical object in FIG. 2. Configuration process 600 then ends, and integration component 128 can apply these recorded inputs and interactions as seen in automated sequential integration process 400 and 500.

In summary, in these illustrative examples, for each data transfer type, set of rules 135 of FIG. 1 is defined. During transfer, integration component 128 performs selected ones of set of rules 135 to transfer, modify, and integrate set of data 123. For example, set of rules 135 may include the following:

1) How to parse a source set of data 123. The data in source 121 can be in any electronic data format. This rule specifies how to define units of work 139. A unit of units of work 139 can comprise one or more fields 141. For example, a unit of units of work 139 could be a single cell from a source spreadsheet, a line of text from a text file that contains sub-fields within it, and any other structured format of set of data 123.

2) How to transform each of fields 141. For example, target 125 for set of data 123 may require changing units of work 139 extracted from source 121 into a standard format using regular expressions. Confirmation may also be required to ensure data for a field that contains data in a certain format is formatted in that format.

3) How to iterate over units of work 139. For example, this may be "go to next cell" in a spreadsheet, "read the next line" in a text file, and any type of logical progression to progress and select a portion of set of data 123.

4) How to transfer each of units of work 139 into target 125. Target 125 can comprise, for example, a web page or stand-alone application. In one example, a web page may contain a multi-field form. This rule maps fields 141 in source 121 defined in rule 1 to corresponding fields 141 in target 125.

5) What action to take in target 125 to complete task 129 on each of units of work 139. For example, on a web page this could include inserting one of units of work 139, using a paste command for example, and then selecting a "submit" button displayed as one of graphical objects 113 in graphical user interface 111 for target 125 to integrate each of units of work 139 into target 125.

With set of actions 131 selected and defined, the steps in the data integration process, referring to Rules 1-5 as set out above, in one illustrative example, include:

1. Integration component 128 selects a portion of set of data 123 and transfers it into operating system 109 clipboard.

2. Integration component 128 enters target location 126 and selects "paste."

3. Using rule #3, the portion of set of data 123 copied into the clipboard is broken down into units of work 139. For each of units of work 139:

Rule #1 is run to break down units of work 139 into fields 141.

Rule #2 is run to transform data in fields 141 into a standard format required in target 125.

Rule #4 is run to transfer the fields 141 in source 121 to fields 141 in target 125.

Rule #5 is run to submit and otherwise process each of units of work 139.

Advantages of using integration component 128 include:

Automated data integration operations on set of data 123 performed in a sequence that is repeated until all of set of data 123 is integrated into target 125. This sequence of operations can include, for example, select data, copy to clipboard, set focus on target window, select target insertion point, paste, and submit information.

Avoids manual pointer and window management operations.

Saves significant amounts of time for manual operations. Estimated time savings under a Keystroke-Level Model (KLM) in some examples total approximately five seconds per operation.

Reduces errors in data operations to transfer data in a repeated sequence.

Turning now to FIG. 7, an illustration of a data processing system is depicted in accordance with an illustrative embodiment. Data processing system 700 may be used to implement computer system 101 in FIG. 1. In this illustrative example, data processing system 700 includes communications framework 702, which provides communications between processor unit 704, memory 706, persistent storage 708, communications unit 710, input/output (I/O) unit 712, and display 714. In this example, communication framework may take the form of a bus system.

Processor unit 704 serves to execute instructions for software that may be loaded into memory 706. Processor unit 704 may be a number of processors, a multi-processor core, and some other type of processor, depending on the particular implementation.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these illustrative examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these illustrative examples. In one example, computer readable media 720 may be computer readable storage media 724 or computer readable signal media 726.

In these illustrative examples, computer readable storage media 724 is a physical or tangible storage device used to store program code 718 rather than a medium that propagates or transmits program code 718.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 700 are not meant to provide architectural limitations to the manner in which different embodiments may be implemented. The different advantageous embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code 718.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application, or technical improvement over technologies found in the marketplace, or to enable others of ordinary skill in the art to understand the embodiments disclosed here.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

What is claimed is:

1. A computer implemented method for performing a task between software components, the computer implemented method comprising:
    identifying, by a computer processor, a first region of a source software component as a source location for the task and a second region of a target software component as a target location for the task;
    responsive to identifying the source location, identifying, by the computer processor, a set of data in the source location of the source software component;
    defining, by the computer processor, the set of data as a plurality of portions of the set of data based on a data structure of the set of data;
    selecting, by the computer processor, a first portion of the plurality of portions of the set of data in the source location;
    generating, by the computer processor, new data from the selected first portion of the set of data;
    using, by the computer processor, the new data in the target location;
    selecting, by the computer processor, a subsequent portion of the set of data without user input; and
    repeating, by the computer processor, the steps of generating, using, and selecting the subsequent portion without user input until all of the plurality of portions of the set of data are processed.

2. The method of claim 1, wherein the step of generating new data from the selected portion of the set of data is selected from a group consisting of:
    validating, by the computer processor, the selected first or subsequent portion, wherein the new data is a validated copy of the selected portion;
    converting, by the computer processor, the selected first or subsequent portion, wherein the new data is derived from a conversion process using the selected portion;
    translating, by the computer processor, the selected first or subsequent portion, wherein the new data is derived from a translation process using the selected first or subsequent portion;
    manipulating, by the computer processor, the selected first or subsequent portion, wherein the new data is derived from a manipulating process using the selected first or subsequent portion; and
    copying, by the computer processor, the selected first or subsequent portion, wherein the new data is derived from a copy of the selected first or subsequent portion.

3. The method of claim 1, wherein identifying the first region of the source software component as the source location for the task and the second region of the target software component as the target location for the task is performed by a user of a graphical user interface, further comprising:
    displaying results in the user interface.

4. The method of claim 1, wherein selecting the subsequent portion of the set of data without user input further comprises at least one of:
    selecting, by the computer processor, a next cell without the user input;
    selecting, by the computer processor, a next line without the user input;
    selecting, by the computer processor, a next section of a document without the user input;

selecting, by the computer processor, a next column of a table without the user input; and selecting, by the computer processor, a next page of a multi-page document without the user input.

5. The method of claim 1, wherein the step of using the new data in the target location comprises transferring, by the computer processor, the new data into the target location of the target software component.

6. The method of claim 5, wherein the step of using the new data in the target location further comprises:

performing, by the computer processor, another action in the target software component to process the new data transferred in the target location of the target software component.

7. A computer program product for automatically performing a task between software components, the computer program product comprising:

a computer readable hardware storage device;

program instructions, stored on the computer readable hardware storage device, to identify a first region of a source software component as a source location for the task and a second region of a target software component as a target location for the task;

program instructions, stored on the computer readable hardware storage device, to identify a set of data in the source location of the source software component in response to identifying the source location;

program instructions, stored on the computer readable hardware storage device, to define the set of data as a plurality of portions of the set of data based on a data structure of the set of data;

program instructions, stored on the computer readable hardware storage device, to select a first portion of the plurality of portions of the set of data;

program instructions, stored on the computer readable hardware storage device, to generate new data from the selected first portion of the set of data;

program instructions, stored on the computer readable hardware storage device, to use the new data in the target location;

program instructions, stored on the computer readable hardware storage device, to select a subsequent portion of the set of data without user input; and program instructions, stored on the computer readable hardware storage device, to repeat the generating, using, and selecting the subsequent portion without user input until all of the plurality of portions of the set of data are processed.

8. The computer program product of claim 7, wherein the program instructions to generate new data from the selected portion of the set of data is selected from a group consisting of:

program instructions to validate the selected first or subsequent portion, wherein the new data is a validated copy of the selected portion;

program instructions to convert the selected first or subsequent portion, wherein the new data is derived from a conversion process using the selected portion;

program instructions to translate the selected first or subsequent portion, wherein the new data is derived from a translation process using the selected first or subsequent portion;

program instructions to manipulate the selected first or subsequent portion, wherein the new data is derived from a manipulating process using the selected first or subsequent portion; and program instructions to copy the selected first or subsequent portion, wherein the new data is derived from a copy of the selected first or subsequent portion.

9. The computer program product of claim 7, wherein identifying the first region of the source software component as the source location for the task and the second region of the target software component as the target location for the task is performed by a user of a graphical user interface and further comprising:

program instructions, stored on the computer readable hardware storage device, for displaying results in the user interface.

10. The computer program product of claim 7, wherein the program instructions to select a subsequent portion of the set of data without user input further comprises at least one of:

program instructions to select a next cell without the user input;

program instructions to select a next line without the user input;

program instructions to select a next section of a document without the user input;

program instructions to select a next column of a table without the user input; and program instructions to select a next page of a multi-page document without the user input.

11. The computer program product of claim 7, wherein the program instructions to use the new data in the target location further comprises program instructions to insert the new data in the target location of the target software component.

12. The computer program product of claim 7, wherein the program instructions to use the new data in the target location further comprises program instructions to transfer the new data into the target location of the target software component.

13. The computer program product of claim 12, wherein the program instructions to use the new data in the target location further comprises:

program instructions to perform another action in the target software component to process the new data transferred into the target location of the target software component.

14. A data processing system automatically performing a task between software components, the data processing system comprising:

a bus system;

one or more computer processors;

one or more computer readable storage device;

program instructions stored on the computer readable storage device for execution by at least one of the one or more computer processors, the program instructions comprising:

program instructions to identify a first region of a source software component as a source location for the task and a second region of a target software component as a target location for the task;

program instructions to identify a set of data in the source location of the source software component in response to identifying the source location;

program instructions to define the set of data as a plurality of portions of the set of data based on a data structure of the set of data;

program instructions to select a first portion of the plurality of portions of the set of data;

program instructions to generate new data from the selected first portion of the set of data;

program instructions to use the new data in the target location;

program instructions to select a subsequent portion of the set of data without user input; and program instructions to repeat the generating, using, and selecting the subsequent portion without user input until all of the plurality of portions of the set of data are processed.

15. The data processing system of claim 14, wherein the program instructions to generate new data from the selected portion of the set of data is selected from a group consisting of:
- program instructions to validate the selected first or subsequent portion, wherein the new data is a validated copy of the selected portion;
- program instructions to convert the selected first or subsequent portion, wherein the new data is derived from a conversion process using the selected portion;
- program instructions to translate the selected first or subsequent portion, wherein the new data is derived from a translation process using the selected first or subsequent portion;
- program instructions to manipulate the selected first or subsequent portion, wherein the new data is derived from a manipulating process using the selected first or subsequent portion; and
- program instructions to copy the selected first or subsequent portion, wherein the new data is derived from a copy of the selected first or subsequent portion.

16. The data processing system of claim 14, wherein program instructions to identify the first region of the source software component as the source location for the task and the second region of the target software component as the target location for the task is performed by a user of a graphical user interface and further comprising:
- program instructions to display the results in the user interface.

17. The data processing system of claim 14, wherein the program instructions to select a subsequent portion of the set of data without user input further comprises at least one of:
- program instructions to select a next cell without the user input;
- program instructions to select a next line without the user input;
- program instructions to select a next section of a document without the user input;
- program instructions to select a next column of a table without the user input; and
- program instructions to select a next page of a multi-page document without the user input.

18. The data processing system of claim 14, wherein the program instructions to use the new data in the target location further comprises program instructions to transfer the new data into the target location of the target software component.

19. The data processing system of claim 18, wherein the program instructions to use the new data in the target location further comprises:
- program instructions to perform another action in the target software component to process the new data transferred into the target location of the target software component.

* * * * *